United States Patent
Kobayashi et al.

(10) Patent No.: US 7,742,503 B2
(45) Date of Patent: Jun. 22, 2010

(54) METHOD AND APPARATUS FOR TRANSMITTING DATA FROM ASYNCHRONOUS NETWORK VIA SYNCHRONOUS NETWORK

(75) Inventors: Masato Kobayashi, Kawasaki (JP); Isao Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

(21) Appl. No.: 12/318,345

(22) Filed: Dec. 24, 2008

(65) Prior Publication Data

US 2009/0290587 A1 Nov. 26, 2009

(30) Foreign Application Priority Data

May 23, 2008 (JP) .............................. 2008-134884

(51) Int. Cl.
*H04J 3/24* (2006.01)

(52) U.S. Cl. ...................... 370/474; 370/389; 370/466; 714/746

(58) Field of Classification Search .................. None
See application file for complete search history.

(56) References Cited

U.S. PATENT DOCUMENTS

| | | | |
|---|---|---|---|
| 5,809,022 A * | 9/1998 | Byers et al. ............ | 370/395.51 |
| 6,169,749 B1 * | 1/2001 | Dove et al. ................... | 370/474 |
| 7,400,647 B1 * | 7/2008 | Cimino et al. .............. | 370/466 |
| 7,586,941 B2 * | 9/2009 | Gonda ......................... | 370/466 |
| 7,653,082 B2 * | 1/2010 | Rees et al. ................... | 370/466 |
| 2006/0098674 A1 | 5/2006 | Hamasaki et al. | |
| 2006/0182134 A1 * | 8/2006 | Pascasio et al. ............. | 370/404 |
| 2008/0037581 A1 * | 2/2008 | Asano ......................... | 370/466 |

FOREIGN PATENT DOCUMENTS

| | | |
|---|---|---|
| JP | 05-292050 | 11/1993 |
| JP | 2001-086156 | 3/2001 |
| JP | 2006-135754 | 5/2006 |

* cited by examiner

*Primary Examiner*—Bob A Phunkulh
(74) *Attorney, Agent, or Firm*—Staas & Halsey LLP

(57) ABSTRACT

A transmitting apparatus for encapsulating data received from an asynchronous network to a frame of a specified format and transmitting the received data as a synchronous frame to a synchronous network, includes a code generating part configured to generate an error detection code for detecting an error in the received data and add the error detection code to the received data, an inverting part configured to perform bit inversion in which the received data added with the error detection code are converted to bit inverted received data, a selecting part configured to select either the received data or the bit inverted received data according to the number of bit patterns included in the received data and the bit inverted received data, and a transmitting part configured to transmit either the received data added with the error detection code or the bit inverted received data selected by the selecting part.

11 Claims, 14 Drawing Sheets

METHOD AND APPARATUS FOR TRANSMITTING DATA FROM ASYNCHRONOUS NETWORK VIA SYNCHRONOUS NETWORK

CROSS-REFERENCE TO RELATED APPLICATIONS

This application is based upon and claims the benefit of priority of the prior Japanese Patent Application No. 2008-134884 filed on May 23, 2008, the entire contents of which are incorporated herein by reference.

BACKGROUND

1. Field

The embodiments discussed herein are related to a method and an apparatus for transmitting data from an asynchronous network via transmitting apparatuses of a synchronous network.

2. Description of the Related Art

Owing to the growth of, for example, the Internet, Local Area Network (LAN) services such as Ethernet (registered trademark) are becoming extremely active. Communication carriers seek to expand service menus, improve communication quality, and provide inexpensive wideband services. Furthermore, communication carriers, in general, build systems by utilizing existing network facilities as much as possible.

In view of the above, PPP (Point-to-Point Protocol) over SONET/SDH is widely used as a method for transmitting packet data of an asynchronous network (e.g., LAN using Ethernet (registered trademark) by using a highly reliable synchronous network that has been widely used from the past (e.g., SONET (Synchronous Optical Network) or SDH (Synchronous Digital Hierarchy)). It is to be noted that, in the description of the specification of the present application, a Wide Area Network (WAN) and a Metropolitan Area Network (MAN) are also included in the term "LAN (Local Area Network)".

FIG. 1 is a schematic diagram illustrating a network configuration using the PPP over SDH method. In FIG. 1, PPP over SDH transmitting apparatuses (hereinafter referred to as "transmitting apparatus") 1, 2 have a function of mapping LAN frames of data from client apparatuses 3, 4 into SDH data areas and transmitting the mapped data by using a wideband SDH transmission network.

FIG. 2 is a block diagram illustrating a PPP over SDH transmitting apparatus according to a related art example. FIG. 3 illustrates a format of a PPP frame. FIG. 4 is a schematic diagram for describing an example of a byte stuffing method.

A PPP over SDH transmitting apparatus (see, for example, IETF RFC 2615) or a PPP over SONET transmitting apparatus encapsulates packet data from an external apparatus (client apparatus) connected to a SONET/SDH network into information fields of HDLC (High Level Data Link Control) like framing (see, for example, IETF RFC 1662) in frame units, maps the encapsulated data into a payload of SONET/SDH frames, and transmits the mapped data.

As illustrated in FIG. 3, in HDLC like framing, the gap parts between frames are filled with flags (in this example, 0x7E indicates a flag where "0x" indicates hexadecimal) so that the data between the flags can be recognized as a PPP frame.

Thus, in a case where data 0x7E (data equal to a flag) are included in a PPP frame, the PPP frame would be erroneously recognized. Accordingly, in a case where a PPP frame includes data 0x7E, a byte stuffing part (as illustrated in, for example, 13) converts the data 0x7E into data 0x7DE (in this example, 7D indicates an escape code) as illustrated in FIG. 4. Likewise, in a case where data 0x7D is included in a PPP frame, the PPP frame would be erroneously recognized as an escape code. Accordingly, in a case where a PPP frame includes data 0x7D, the data 0x7D is converted into data 0x7D5D. This process is referred to as byte stuffing.

In FIG. 2, LAN packet data supplied from an external apparatus are supplied to a transmitting apparatus 10. The supplied data are encapsulated in an information field of a PPP frame (HDLC like framing) by a PPP encapsulating part 11. The encapsulated data are added with a Frame Check Sequence (FCS) by an FCS generating part 12. Then, the byte stuffing part 13 performs a byte stuffing process on the encapsulated data. Then, the byte-stuffed encapsulated data are scrambled by a scrambling part 14. Then, an SDH framing part 15 maps the scrambled encapsulated data into SDH frames and fills gap parts with flags, to thereby transmit the SDH frames to an SDH transmission network 16.

The SDH frames transmitted from the SDH transmission network 16 are received by a receiving apparatus 20. In the receiving apparatus 20, flags provided between the SDH frames are removed by an SDH framing part 21. Then, a descrambling part 22 descrambles the SDH frames. Then, a byte de-stuffing part 23 de-stuffs the descrambled SDH frames to thereby return the descrambled SDH frames to a state being subject to the byte stuffing process. Then, after FCS detection is performed on the destuffed SDH frames, a PPP decapsulating part 25 decapsulates the SDH frames, to thereby obtain the LAN packet data. Then, the PPP decapsulating part 25 transmits the LAN packet data to another external apparatus.

In order to control the transmission amount of a PPP frame, Japanese Laid-Open Patent Publication No. 2006-135754 discloses a device that detects the amount of data received from other apparatuses and uses fixed stuff for storing a PPP frame in a case where the received data exceeds a threshold.

Further, as another related art example, Japanese Laid-Open Patent Publication No. 2001-86156 discloses a system where fixed values in an address field and a control field of a PPP frame are used as identification code values corresponding to various information.

Further, Japanese Laid-Open Patent Publication No. 5-292050 discloses a system where a part of a synchronization pattern of an SDH frame is left unscrambled so that degradation of bit error rate (e.g., pattern jitter) can be prevented by inverting each byte of the synchronization pattern.

In HDLC like framing where 0x7E (same code as flag) and 0x7D (same code as escape code) exists in the original data, one byte of data is converted into two bytes of data including an escape code, to thereby increase the amount of data flowing in the SDH transmission path. In a worst case (a case where all of the original data are 7E/7D), the converted data becomes twice its original data amount.

Particularly, since the transmitting apparatus 10 is unable to control the client's data mapped into the information field that forms a large part of the PPP frame, data may become lost due to lack of bandwidth unless a bandwidth doubling the client's data is prepared in the SONET/SDH. Accordingly, it is desired to operate the client's data bandwidth by preparing a bandwidth having a margin added to the client's data bandwidth in the SONET/SDH transmission path. This, however, leads to decrease of line utilization.

SUMMARY

According to an aspect of the invention, a transmitting apparatus for encapsulating reception data received from an asynchronous network to a frame of a specified format and transmitting the reception data as a synchronous frame to a synchronous network, includes: a code generating part configured to generate an error detection code for detecting an error in the reception data and add the error detection code to the reception data; an inverting part configured to perform bit inversion in which the reception data added with the error detection code are converted to bit inverted reception data; a selecting part configured to select either the reception data or the bit inverted reception data according to the number of bit patterns included in the reception data and the bit inverted reception data; and a transmitting part configured to transmit either the reception data added with the error detection code or the bit inverted reception data selected by the selecting part.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

DESCRIPTION OF EMBODIMENTS

In the following, embodiments of the present invention will be described with reference to the accompanying drawings.

The below-described embodiments of the present invention aim to, for example, improve line utilization in a synchronous network.

With the below-described embodiments of the present invention, line utilization in a synchronous network can be improved.

First Embodiment

Figure 1:
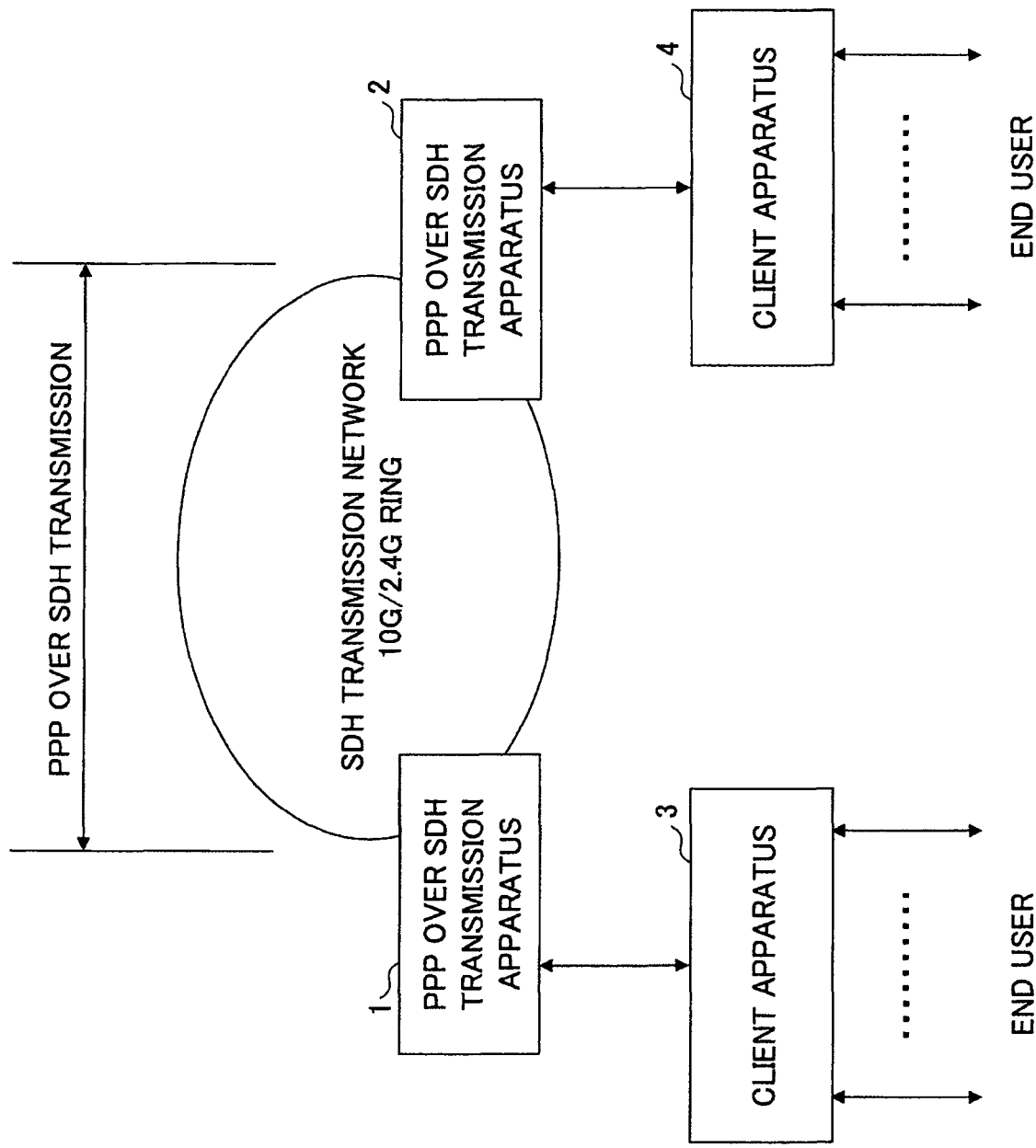
FIG. 1 is a schematic diagram illustrating a network configuration using a PPP over SDH method.
Figure 2:
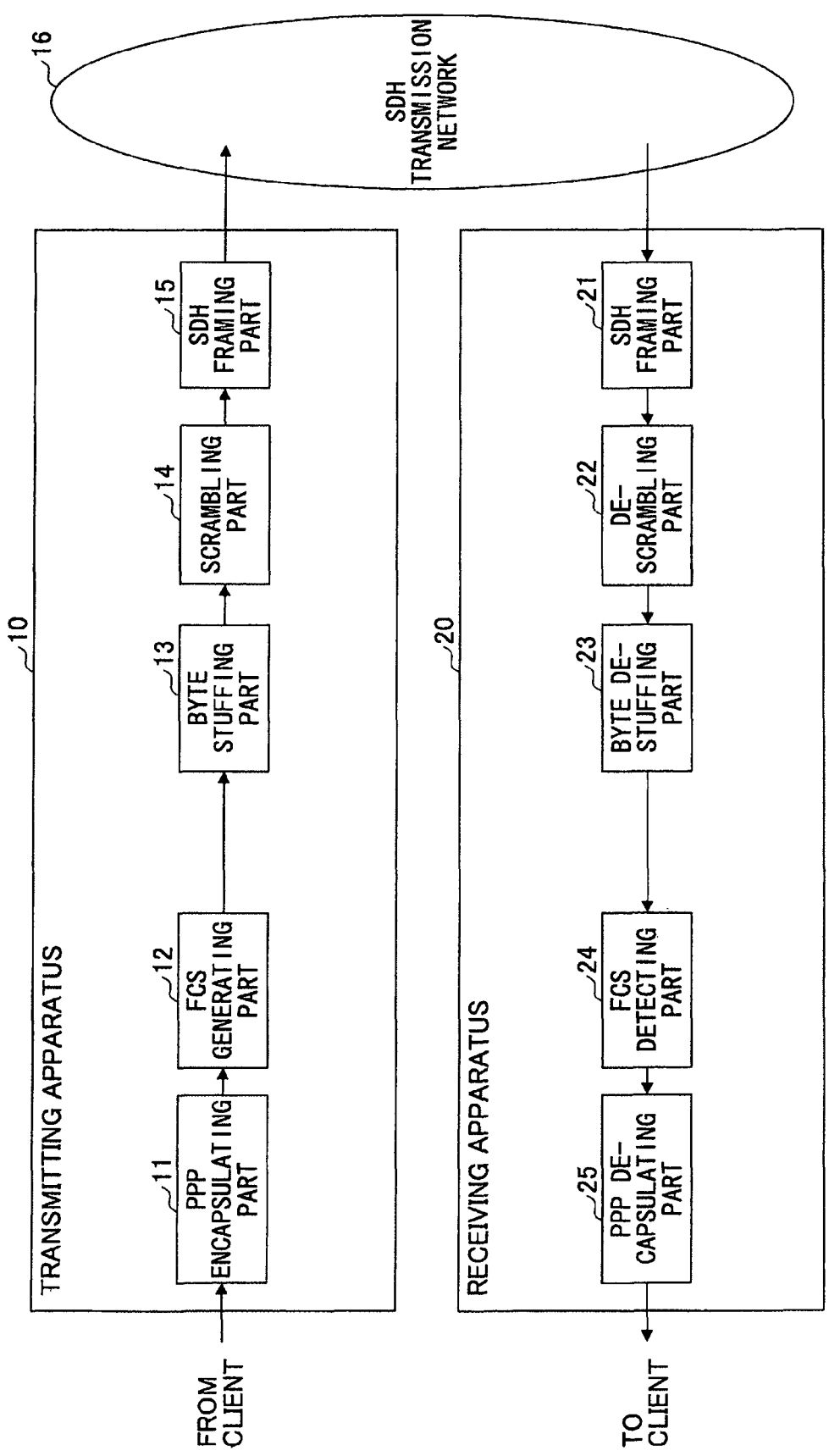
FIG. 2 is a block diagram illustrating a PPP over SDH transmitting apparatus according to a related art example.
Figure 3:
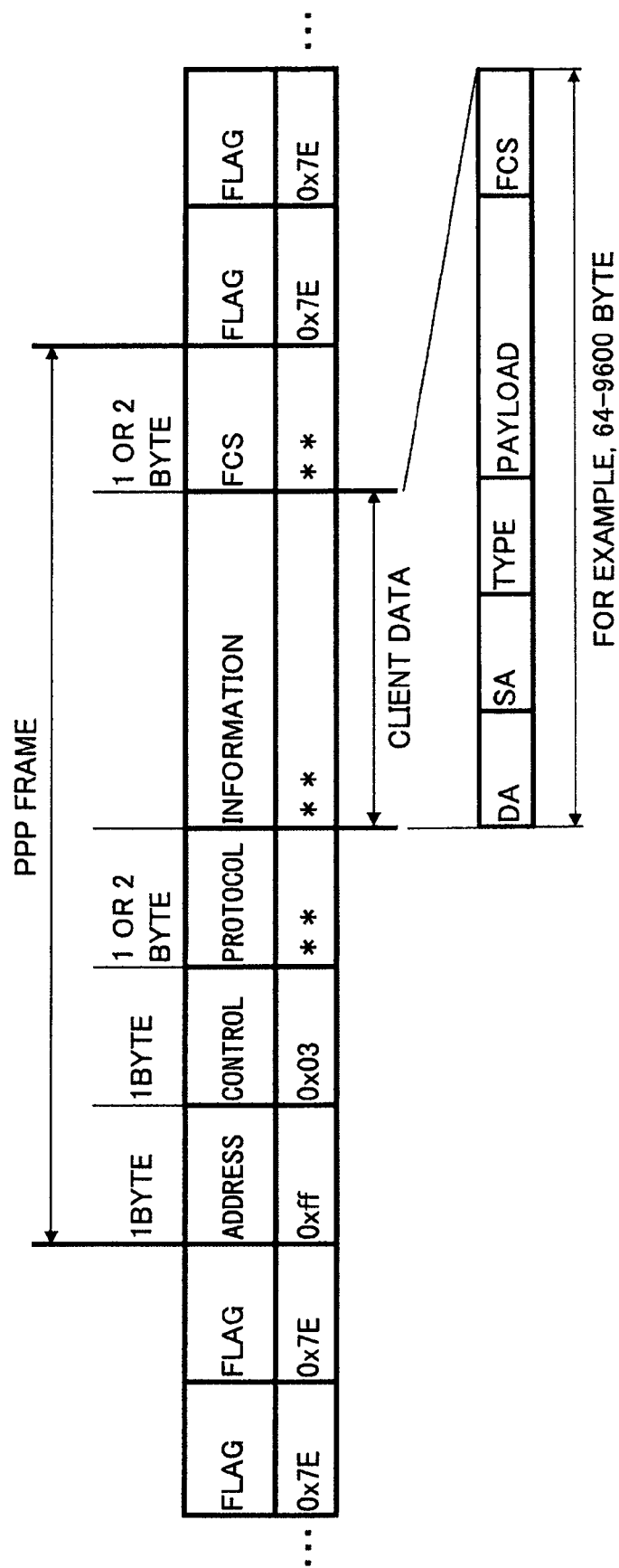
FIG. 3 illustrates an example of a format of a PPP frame.
Figure 4:
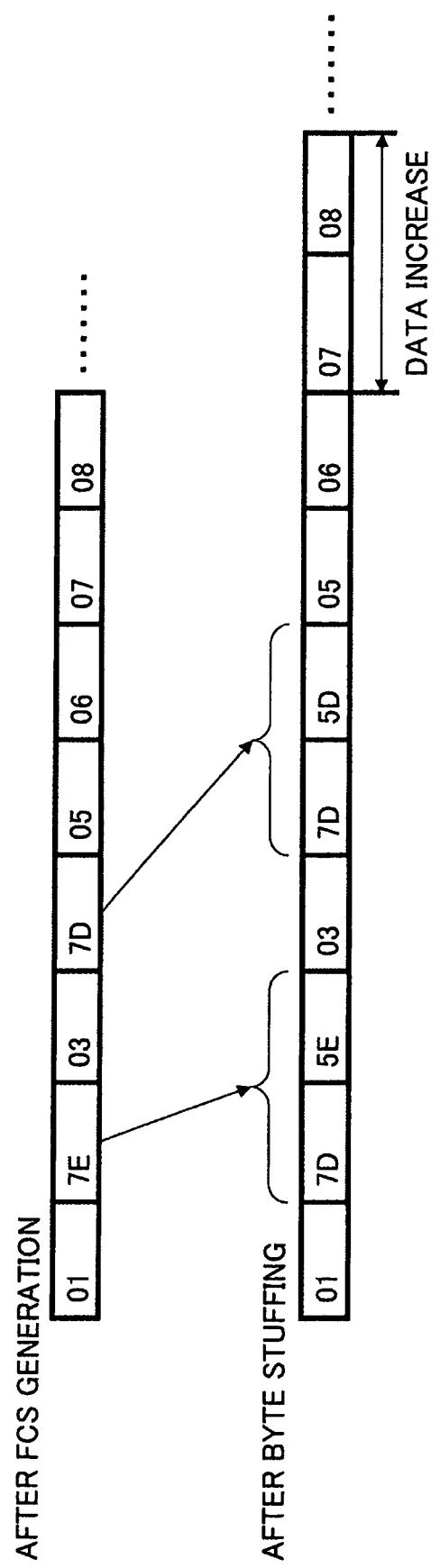
FIG. 4 is a schematic diagram for describing an example of a byte stuffing method.
Figure 5:
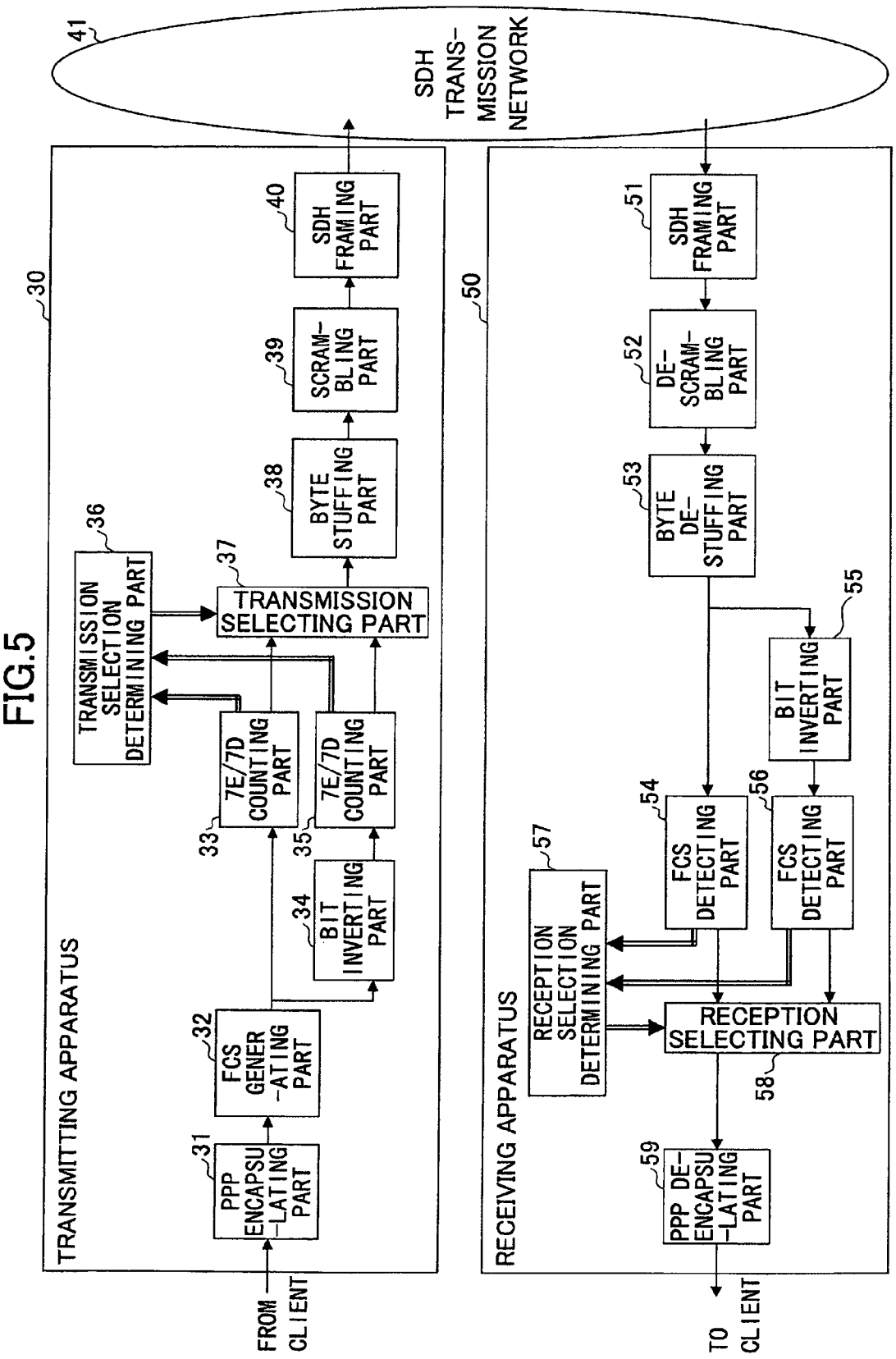
FIG. 5 is a block diagram illustrating a PPP over SDH transmission system according to a first embodiment of the present invention.
Figure 6:
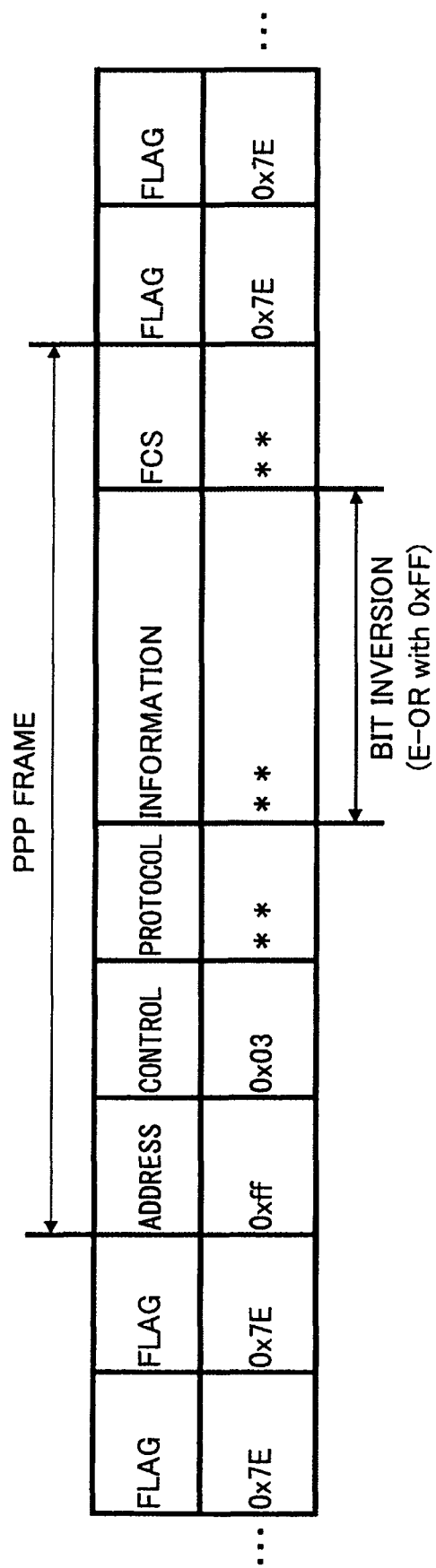
FIG. 6 illustrates an example of a PPP frame format.
Figure 7:
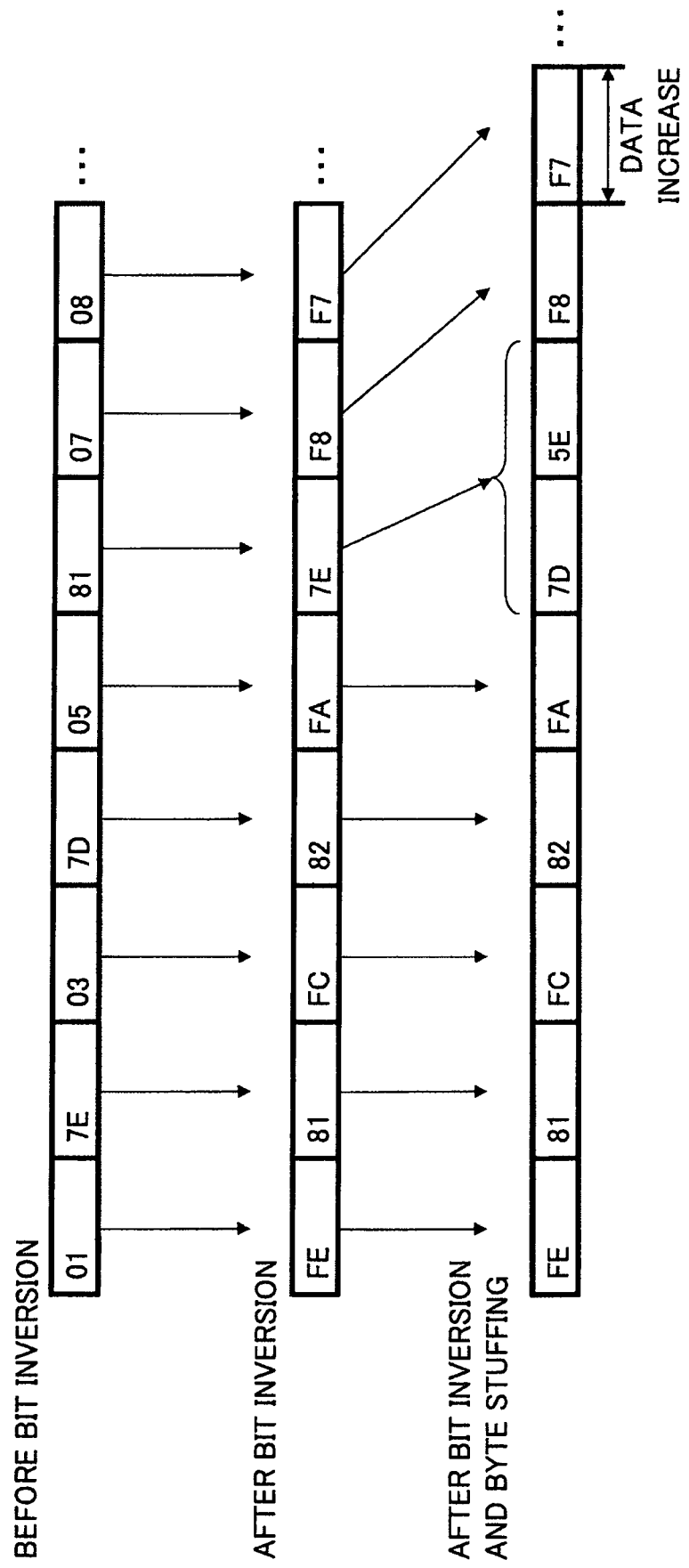
FIG. 7 is a schematic diagram for describing an example of a byte stuffing method.

FIG. 5 is a block diagram illustrating a PPP over SDH transmission system according to a first embodiment of the present invention. FIG. 6 illustrates an example of a PPP frame format (specified format). FIG. 7 is a schematic diagram for describing an example of a byte stuffing method.

In FIG. 5, LAN packet data from an external device are supplied to a transmitting apparatus 30 (i.e. transmitting apparatus on the transmitting side). A PPP encapsulating part 31 encapsulates the packet data in an information field of a PPP frame (HDLC like framing) illustrated in FIG. 6 in frame units. Then, an FCS generating part 32 adds FCS (Frame Check Sequence) serving as error detection codes to the PPP frame.

The PPP frame being added with the FCS is supplied to a 7E/7D counting part 33. In addition, each byte in the information field of the PPP frame has its bits inverted by a bit inverting part 34 and is supplied to the 7E/7D counting part 35.

It is to be noted that, for example, the bit inverting part 34 performs the bit inversion in byte units by performing an exclusive OR operation with 0xFF on the information field.

The 7E/7D counting part 33 counts the number of bytes of 0x7E (same code as flag) or 0x7D (same code as escape code) in the PPP frame, supplies the counted value to a transmission selection determining part 36, and supplies the PPP frame to a transmission selecting part 37.

The 7E/7D counting part 35 counts the number of bytes of 0x7E or 0x7D in the inverted PPP frame, supplies the counted value to the transmission selection determining part 36, and supplies the inverted PPP frame to the transmission selecting part 37.

The transmission selection determining part 36 compares the counted value of the 7E/7D counting part 33 and the counted value of the 7E/7D counting part 35 and instructs (indicates) the transmission selecting part 37 to select the PPP frame having a lesser counted value. Accordingly, the transmission selecting part 37 selects the bytes supplied from either one of the 7E/7D counting part 33 or the 7E/7D counting part 35 and supplies the selected bytes to a byte stuffing part 38.

The byte stuffing part 38 performs byte stuffing on the supplied data in which the byte stuffing part 38 converts 0x7E to 0x7D5E data in a case where 0x7E data exists in the PPP frame and converts 0x7D data to 0x7D5D data in a case where 0x7D exists in the PPP frame. Then, a scrambling part 39 scrambles the PPP frame output from the byte stuffing part 38. Then, an SDH framing part 40 maps the scrambled data into SDH frames, allocates (buries) flags in between the SDH frames, and transmits the SDH frames to a SDH transmission network 41.

In this example, as illustrated in FIG. 7, each of the bytes of data 0x7E, 0x7D, and 0x81 before bit inversion is converted to 0x81, 0x82, and 0x7E after bit inversion, respectively. The byte 0x7E after bit inversion becomes byte 0x7D5E after byte stuffing.

Since the number of bytes 0x7E and 0x7D existing in the PPP frame prior to the bit inversion is two, the number of bytes increases by two bytes. On the other hand, since the number of bytes 0x7E and 0x7D existing in the PPP frame subsequent to the bit inversion is one, the number of bytes increases by one byte.

The SDH frames transmitted through the SDH transmission network 41 are received by a receiving apparatus 50 (i.e. transmitting apparatus on the receiving side). In the receiving apparatus 50, an SDH framing part 51 eliminates the flags provided between the frames. Then, a descrambling part 52 descrambles (releases) the scrambled data. Then, a byte de-stuffing part 53 returns the PPP frame back to the state before byte stuffing. Then, the PPP frame is supplied to an FCS detecting part 54 and a bit inverting part 55.

The FCS detecting part 54 detects errors in the PPP frame by using the FCS in the PPP frame, supplies the result of the detection to a reception selection determining part 57, and supplies the PPP frame to a reception selecting part 58.

The bit inverting part 55 performs bit inversion on each byte in the information field of the PPP frame in bit units and supplies the PPP frame including the inverted data to an FCS detecting part 56. The FCS detecting part 56 detects errors in the PPP frame by using the FCS in the PPP frame, supplies the result of the detection to the reception selection determining part 57, and supplies the PPP frame to the reception selecting part 58.

It is to be noted that, for example, the bit inverting part 55 performs the bit inversion in byte units by performing an exclusive OR operation with 0xFF on the information field.

Then, the reception selection determining part 57 compares the error detection result from the FCS detecting part 54 and the error detection result from the FCS detecting part 56 and instructs (indicates) the reception selecting part 58 to select a PPP frame having no error detected (or a PPP frame having fewer errors detected). Accordingly, the reception selecting part 58 selects the bytes supplied from either one of the FCS detecting part 54 or the FCS detecting part 56 and supplies the selected bytes to a PPP decapsulating part 59.

The PPP decapsulating part 59 performs PPP decapsulation by extracting the LAN packet data from the information field in the PPP frame and transmits the LAN packet data to an external device.

In this embodiment, bit inversion is performed/not performed on the entire bits of the information field (byte data) in byte units (1 byte=8 bits). Thus, there are simply two combinations (inverting all bits + inverting none of the bits) in performing bit inversion on the information field. Therefore, the transmission method according to the above-described embodiment can be realized with a simple configuration. In this embodiment, the increase of data subsequent to byte stuffing is maximum in a case where half the data of the information field are 0x7D or 0x7E while half the remaining data of the information field are 0x81 (data that becomes 0x7E when inverted) or 0x82 (data that becomes 0x7D when inverted). Accordingly, the data increase can be suppressed to a maximum of 1.5 times the original data.

Second Embodiment

Figure 8:
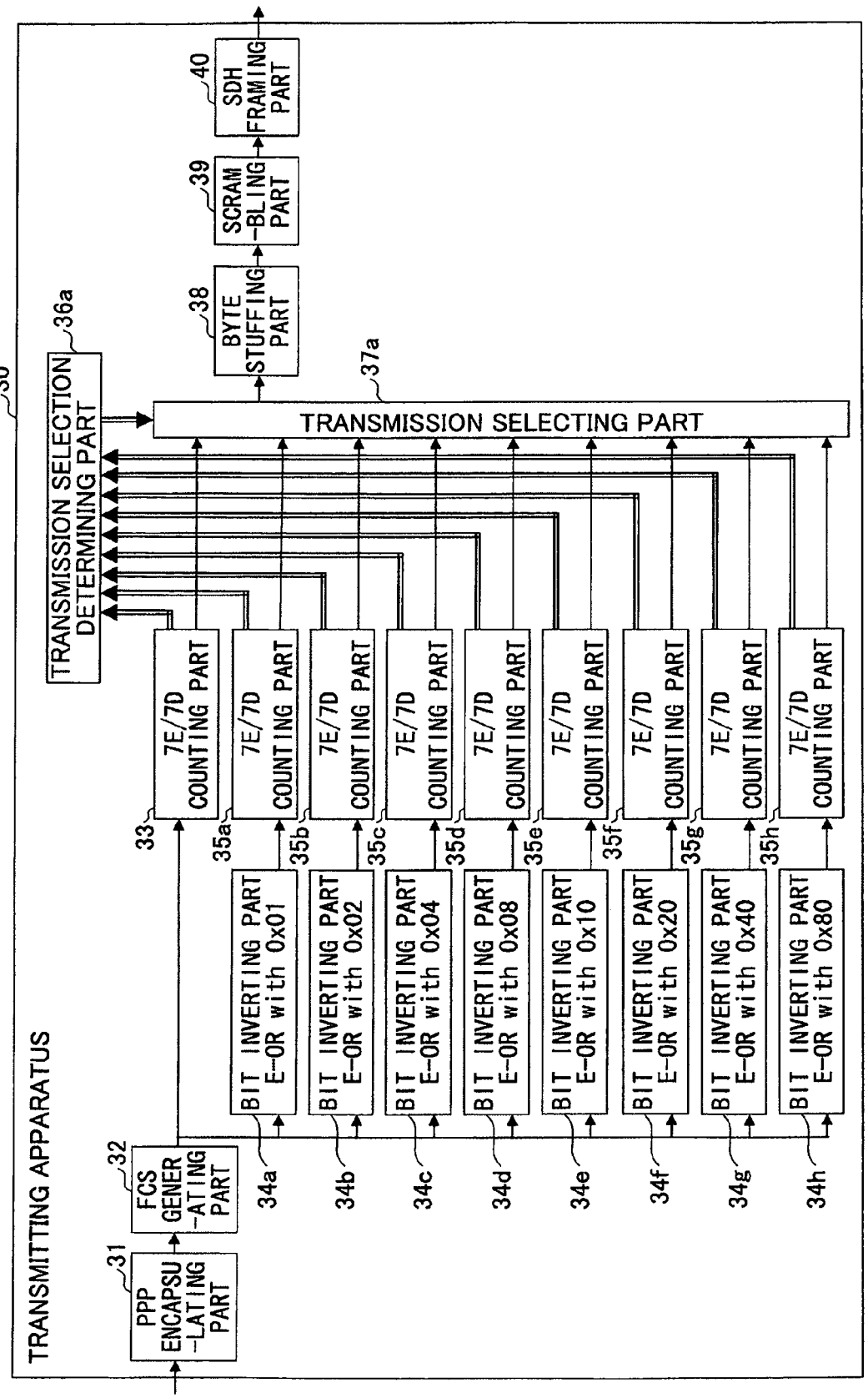
FIG. 8 is a block diagram illustrating a transmitting apparatus (transmitting side) in a PPP over SDH transmission system according to a second embodiment of the present invention.
Figure 9:
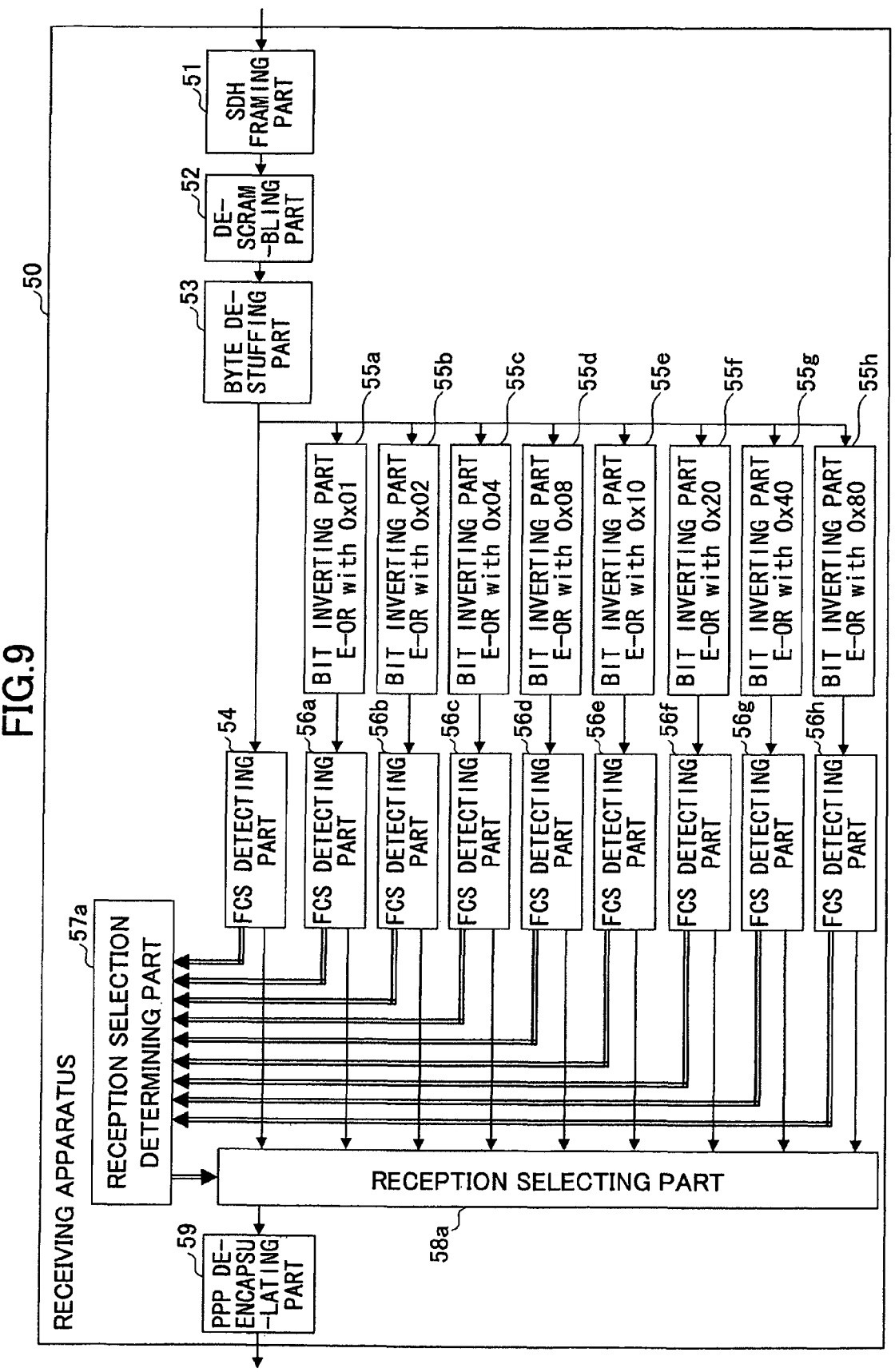
FIG. 9 is a block diagram illustrating a transmitting apparatus (receiving side) in a PPP over SDH transmission system according to a second embodiment of the present invention.

FIGS. 8 and 9 are block diagrams illustrating a PPP over SDH transmission system according to a second embodiment of the present invention. In FIGS. 8 and 9, like components are denoted with like reference numerals as in FIG. 5 and are not further explained.

In FIG. 8, LAN packet data from an external device are supplied to the transmitting apparatus 30. The PPP encapsulating part 31 encapsulates the packet data in an information field of the PPP frame illustrated in FIG. 6 in frame units. Then, the FCS generating part 32 adds FCS to the PPP frame.

The PPP frame being added with the FCS is supplied to the 7E/7D counting part 33. In addition, each byte in the information field of the PPP frame has its bits inverted in bit units (i.e. bit by bit) by bit inverting parts 34a-34h and is supplied to corresponding 7E/7D counting part 35a-35h.

That is, the bit inverting part 34a inverts only the first bit by performing exclusive OR operation with 0x01 on the information field (byte data), the bit inverting part 34b inverts only the second bit by performing exclusive OR operation with 0x02 on the information field (byte data), the bit inverting part 34c inverts only the third bit by performing exclusive OR operation with 0x04 on the information field (byte data), and the bit inverting part 34d inverts only the fourth bit by performing exclusive OR operation with 0x08 on the information field (byte data).

Further, the bit inverting part 34e inverts only the fifth bit by performing exclusive OR operation with 0x10 on the information field (byte data), the bit inverting part 34f inverts only the sixth bit by performing exclusive OR operation with 0x20 on the information field (byte data), the bit inverting part 34g inverts only the seventh bit by performing exclusive OR operation with 0x40 on the information field (byte data), and the bit inverting part 34h inverts only the eighth bit by performing exclusive OR operation with 0x80 on the information field (byte data).

The 7E/7D counting part 33 counts the number of bytes of 0x7E (same code as flag) or 0x7D (same code as escape code) in the PPP frame, supplies the counted value to a transmission selection determining part 36a, and supplies the PPP frame to a transmission selecting part 37a.

Each of the 7E/7D counting parts 35a-35h counts the number of bytes of 0x7E or 0x7D in the inverted PPP frame from corresponding bit inverting parts 34a-34h, supplies the counted value to the transmission selection determining part 36a, and supplies the inverted PPP frame to the transmission selecting part 37a.

The transmission selection determining part 36a compares the counted value of the 7E/7D counting part 33 and the counted values of the 7E/7D counting parts 35a-35h and instructs (indicates) the transmission selecting part 37a to select the PPP frame having the least counted value. Accordingly, the transmission selecting part 37a selects the bytes supplied from one of the 7E/7D counting parts 33, 35a-35h and supplies the selected bytes to the byte stuffing part 38.

The byte stuffing part 38 performs byte stuffing on the supplied data in which the byte stuffing part 38 converts 0x7E to 0x7D5E data in a case where 0x7E data exists in the PPP frame and converts 0x7D data to 0x7D5D data in a case where 0x7D exists in the PPP frame. Then, the scrambling part 39 scrambles the PPP frame output from the byte stuffing part 38. Then, the SDH framing part 40 maps the scrambled data into SDH frames, allocates (buries) flags in between the SDH frames, and transmits the SDH frames to the SDH transmission network (not shown).

In FIG. 9, the SDH frames transmitted through the SDH transmission network are received by the receiving apparatus 50. In the receiving apparatus 50, the SDH framing part 51 eliminates the flags provided between the frames. Then, the descrambling part 52 descrambles (releases) the scrambled data. Then, the byte de-stuffing part 53 returns the PPP frame back to the state before byte stuffing. Then, the PPP frame is supplied to the FCS detecting part 54 and bit inverting parts 55a-55h.

The FCS detecting part 54 detects errors in the PPP frame by using the FCS in the PPP frame, supplies the result of the detection to a reception selection determining part 57a, and supplies the PPP frame to a reception selecting part 58a.

In the same manner as the bit inverting parts 34a-34h, each of the bit inverting parts 55a-55h performs bit inversion on each byte in the information field of the PPP frame in bit units (i.e. bit by bit) and supplies the PPP frame including the inverted data to corresponding FCS detecting parts 56a-56h. Each of the FCS detecting parts 56a-56h detects errors in the PPP frame by using the FCS in the PPP frame, supplies the result of the detection to the reception selection determining part 57a, and supplies the PPP frame to the reception selecting part 58a.

Then, the reception selection determining part 57a compares the error detection result from the FCS detecting part 54 and the error detection results from the FCS detecting parts 56a-56h and instructs (indicates) the reception selecting part 58a to select a PPP frame having no error detected (or a PPP frame having fewer errors detected). Accordingly, the reception selecting part 58a selects the bytes supplied from one of the FCS detecting parts 54, 56a-56h and supplies the selected bytes to the PPP decapsulating part 59.

The PPP decapsulating part 59 performs PPP decapsulation by extracting the LAN packet data from the information field in the PPP frame and transmits the LAN packet data to an external device.

In this embodiment, bit inversion is performed/not performed on a single bit of the information field (byte data) in byte units (1 byte=8 bits). In this embodiment, the increase of data subsequent to byte stuffing becomes maximum (worst case) in a case where the entire data subsequent to the bit inversion (in this example, performing bit inversion on a corresponding bit of each byte (1/9)) are 0x7D or 0x7E. Accordingly, even in the worst state, the data increase can be suppressed to a maximum of 1.11 times the original data.

Alternatively, by changing the number of bits to be inverted with respect to each byte, there are 256 patterns of the bit inversion (255 patterns of performing bit inversion and 1 pattern of performing no bit inversion). In this case, the data increase can be suppressed to a maximum of 1.004 times the original data.

It is to be noted that, although the foregoing embodiment describes bit inversion performed in bit units (one bit each), the bit inversion may be performed, for example, in 2 bit units (two bits each), 4 bit units (four bits each), or byte units (one byte each).

Third Embodiment

In a PPP over SDH transmission or a PPP over SONET transmission system, the protocol field of the PPP frame as illustrated in FIG. 6 is closed in the network and is not transmitted to the client. Therefore, a code indicating whether bits are inverted (i.e. bit inversion information) can be added to the protocol field frame by frame and transmitted from the transmitting apparatus 30 and the receiving apparatus 50.

By adding bit inversion information to each of the frames and transmitting the frames, the receiving apparatus 50 can recognize bit inversion of the frames, to thereby reconstruct the frames back to original LAN packet data (client data) and transfer the LAN packet data to the client.

Figure 10:
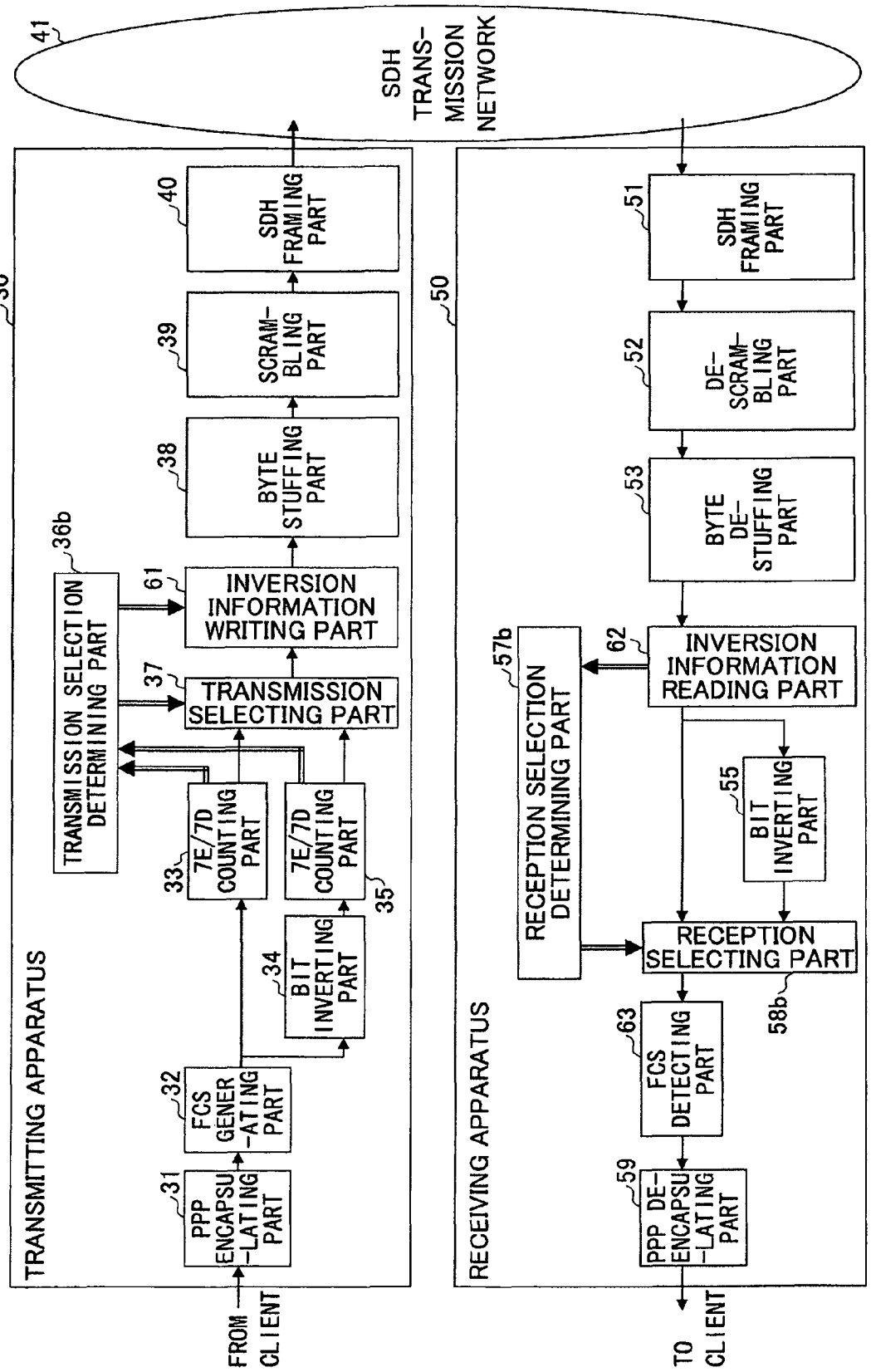
FIG. 10 is a block diagram illustrating a PPP over SDH transmission system according to a third embodiment of the present invention.
Figure 11:
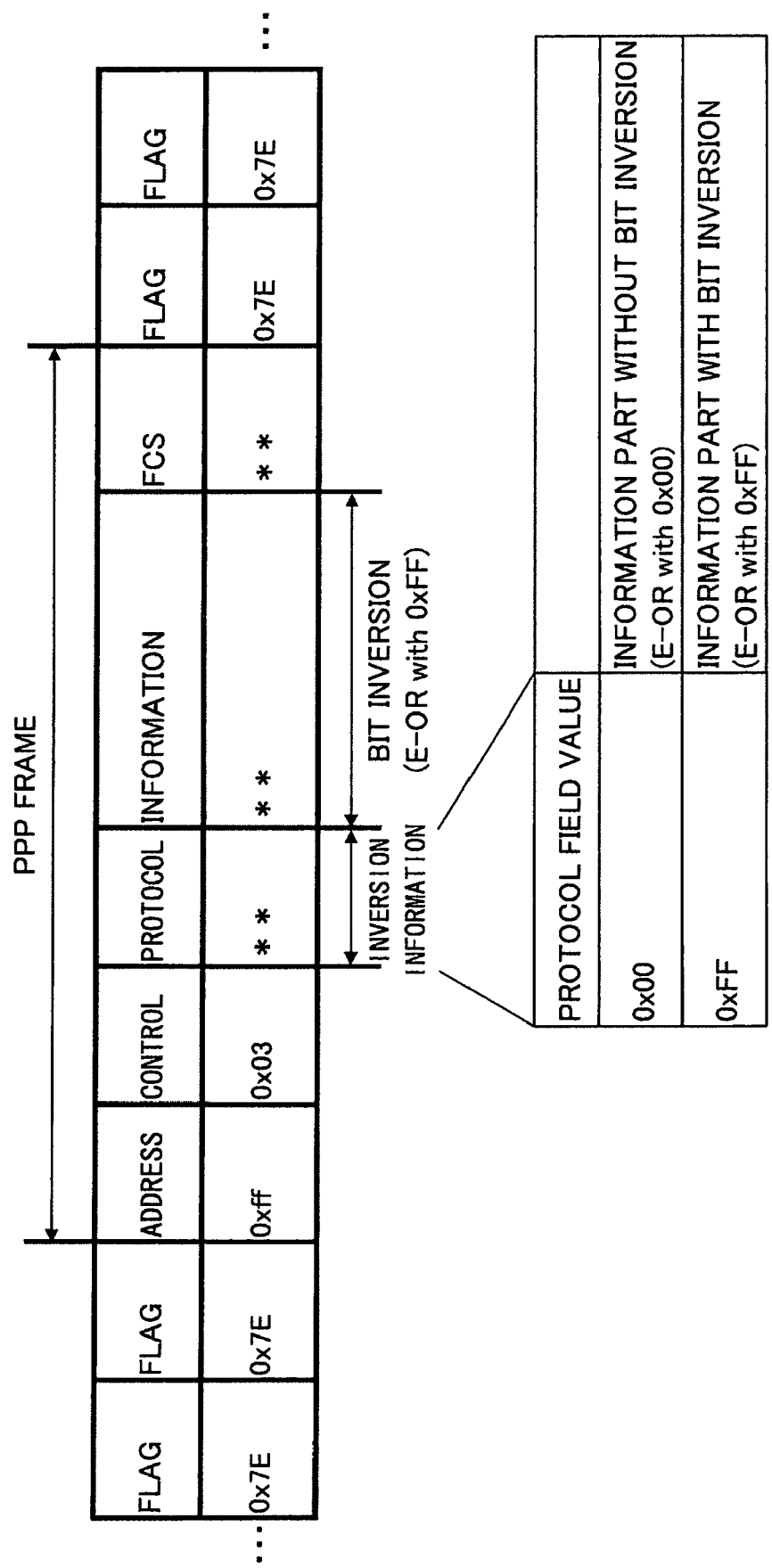
FIG. 11 illustrates an example of a PPP frame format.

FIG. 10 is a block diagram illustrating a PPP over SDH transmission system according to a third embodiment of the present invention. Further, FIG. 11 illustrates an example of a PPP frame format.

In FIG. 10, like components are denoted with like reference numerals as of the FIG. 5 and are not further explained. In FIG. 10, LAN packet data from an external device are supplied to the transmitting apparatus 30. The PPP encapsulating part 31 encapsulates the packet data in an information field of a PPP frame illustrated in FIG. 11 in frame units. Then, the FCS generating part 32 adds FCS to the PPP frame.

The PPP frame being added with the FCS is supplied to the 7E/7D counting part 33. In addition, each byte in the information field of the PPP frame has its bits inverted in bit units by the bit inverting part 34 and is supplied to the 7E/7D counting part 35.

The 7E/7D counting part 33 counts the number of bytes of 0x7E or 0x7D in the PPP frame, supplies the counted value to a transmission selection determining part 36b, and supplies the PPP frame to the transmission selecting part 37.

It is to be noted that, for example, the bit inverting part 34 performs the bit inversion in byte units by performing exclusive OR operation with 0xFF on the information field.

The 7E/7D counting part 35 counts the number of bytes of 0x7E or 0x7D in the inverted PPP frame, supplies the counted value to the transmission selection determining part 36b, and supplies the inverted PPP frame to the transmission selecting part 37.

The transmission selection determining part 36b compares the counted value of the 7E/7D counting part 33 and the counted values of the 7E/7D counting parts 35a-35h and instructs (indicates) the transmission selecting part 37 and a inversion information writing part 61 to select the PPP frame having a lesser counted value. Accordingly, the transmission selecting part 37 selects the bytes supplied from one of the 7E/7D counting parts 33, 35a-35h and supplies the selected bytes to the inversion information writing part 61.

The inversion information writing part 61 writes inversion information to the protocol field of the PPP frame (see FIG. 11) according to the instruction (selection instruction) from the transmission selection determining part 36b. The inversion information includes, for example, "0x00" indicating that there is no inverted bits in the information field and "0xFF" indicating that there is an inverted bit(s) in the information field. After the inversion information writing part 61 writes the inversion information in the protocol field of the PPP frame, the inversion information writing part 61 supplies the PPP frame to the byte stuffing part 38.

The byte stuffing part 38 performs byte stuffing on the supplied data in which the byte stuffing part 38 converts 0x7E to 0x7D5E data in a case where 0x7E data exists in the PPP frame and converts 0x7D data to 0x7D5D data in a case where 0x7D exists in the PPP frame. Then, the scrambling part 39 scrambles the PPP frame output from the byte stuffing part 38. Then, the SDH framing part 40 maps the scrambled data into SDH frames, allocates (buries) flags in between the SDH frames, and transmits the SDH frames to the SDH transmission network 41.

The SDH frames transmitted through the SDH transmission network 41 are received by the receiving apparatus 50. In the receiving apparatus 50, the SDH framing part 51 eliminates the flags provided between the frames. Then, the descrambling part 52 descrambles (releases) the scrambled data. Then, the byte de-stuffing part 53 returns the PPP frame back to the state before byte stuffing. Then, the PPP frame is supplied to an inversion information reading part 62.

The inversion information reading part 62 reads out the inversion information written in the protocol field of the PPP frame and supplies the inversion information to a reception selection determining part 57b. Further, the inversion information reading part 62 supplies the PPP frame to the bit inverting part 55 and a reception selecting part 58b.

The bit inverting part 55 performs bit inversion on each byte in the information field of the PPP frame in byte units and supplies the PPP frame including the inverted data to the reception selecting part 58b. For example, the bit inverting part 55 performs the bit inversion in byte units by performing exclusive OR operation with 0xFF on the information field.

The reception selection determining part 57b instructs (indicates) the reception selecting part 58b to select either a PPP frame having no bits inverted in the information field (output of the inversion information reading part 62) or a PPP frame having an inverted bit(s) in the information field (output of the bit inverting part 55). Accordingly, the reception selecting part 58 selects the PPP frame supplied from either one of the inversion information reading part 62 or the bit inverting part 55 and supplies the selected PPP frame to an FCS detecting part 63.

The FCS detecting part 63 detects errors in the PPP frame by using the FCS in the PPP frame and supplies the result of the detection to the PPP decapsulating part 59. The PPP decapsulating part 59 performs PPP decapsulation by extracting the LAN packet data from the information field in the PPP frame and transmits the LAN packet data to an external device.

In this embodiment, although the aspect of writing inversion information in the information field is applied to the configuration of the first embodiment, the aspect of writing inversion information in the information field may also be applied to the configuration of the second embodiment.

Fourth Embodiment

Figure 12:
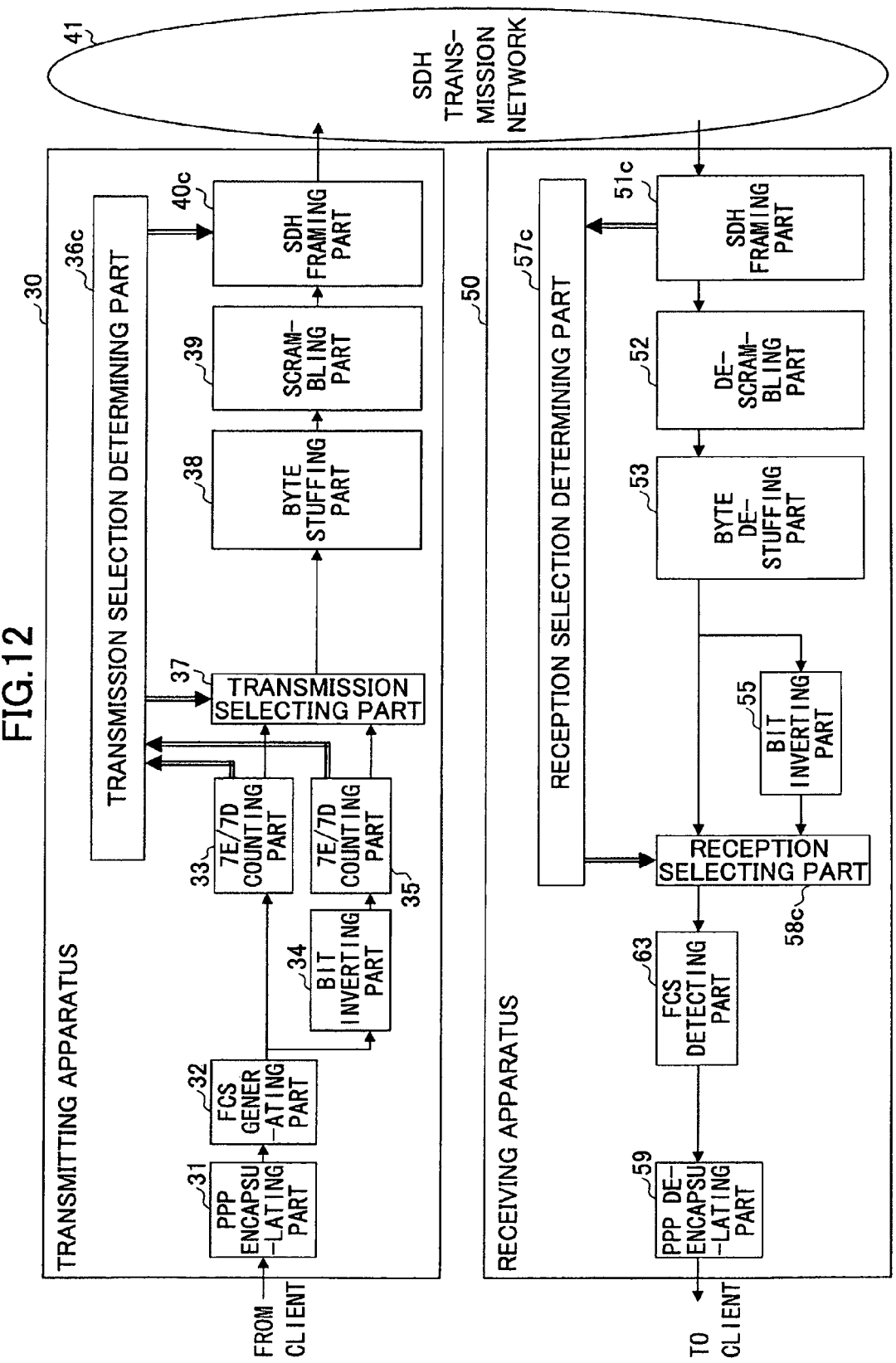
FIG. 12 is a block diagram illustrating a PPP over SDH transmission system according to a fourth embodiment of the present invention.
Figure 13:
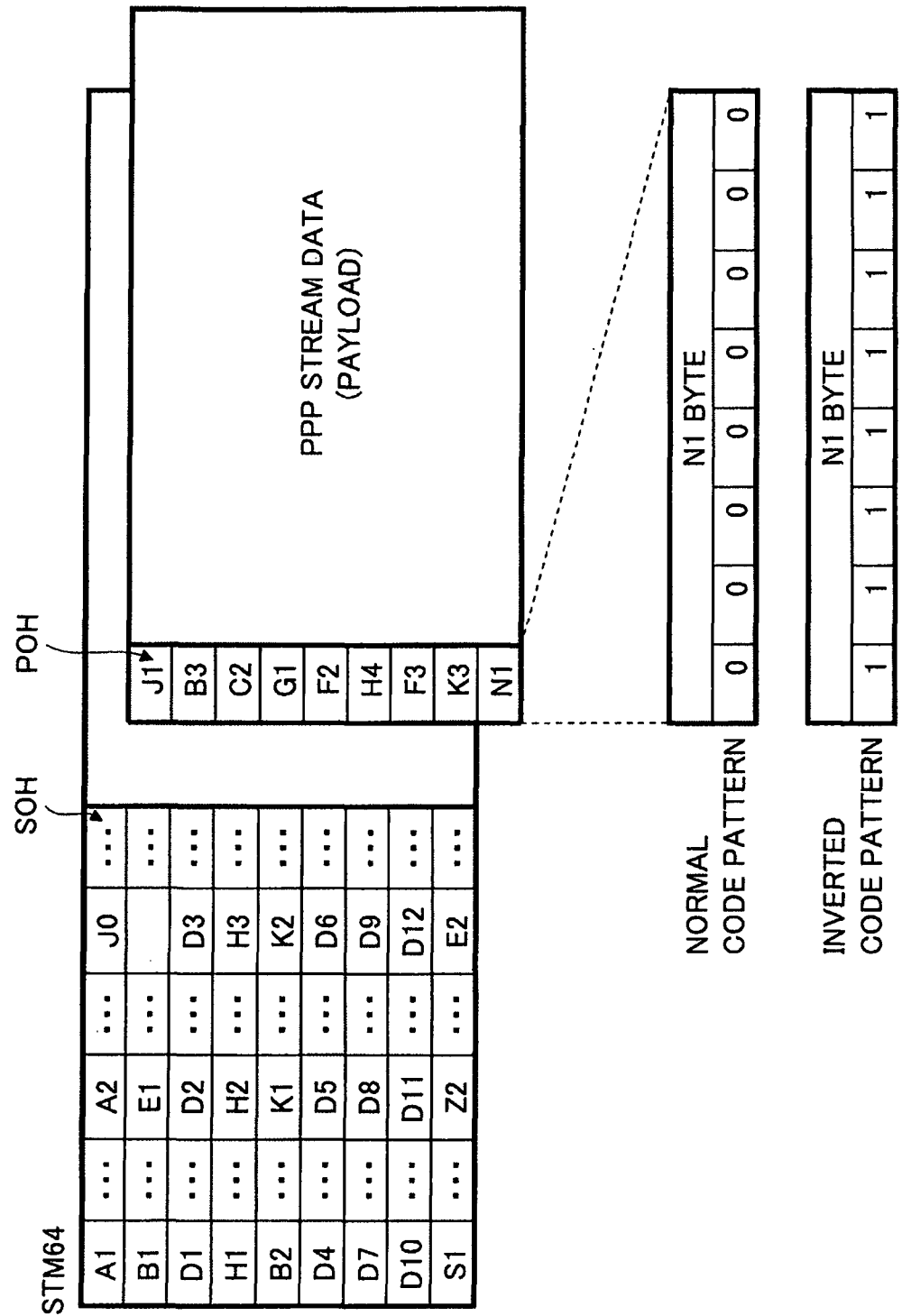
FIG. 13 is a schematic diagram illustrating an example of an SDH frame format.
Figure 14:
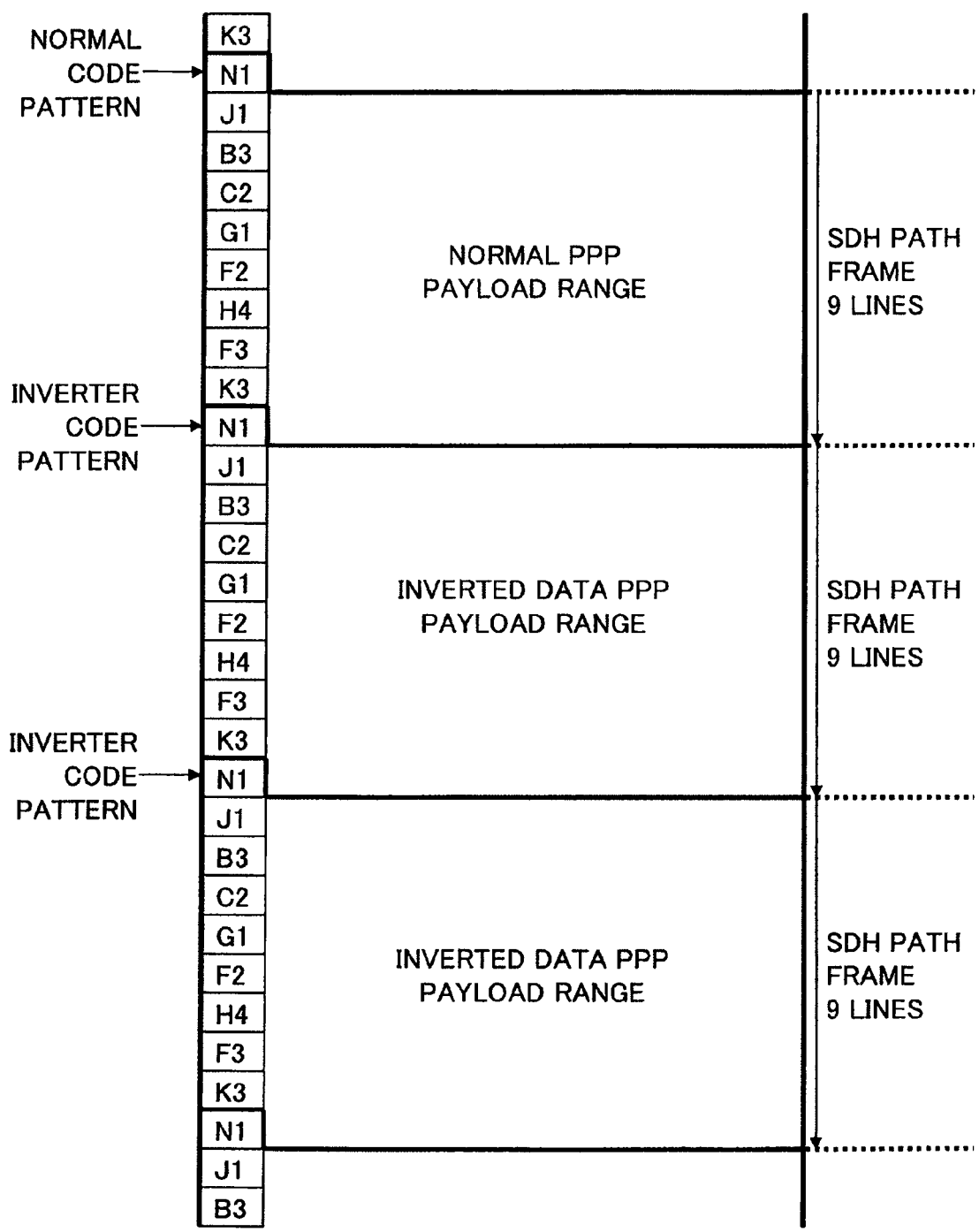
FIG. 14 is another schematic diagram illustrating an example of an SDH frame format.

FIG. 12 is a block diagram illustrating a PPP over SDH transmission system according to a fourth embodiment of the present invention. Further, FIGS. 13 and 14 illustrate examples of an SDH frame format.

In FIG. 12, like components are denoted with like reference numerals as of the FIG. 5 and are not further explained. LAN packet data from an external device are supplied to the transmitting apparatus 30. The PPP encapsulating part 31 encapsulates the packet data in an information field of a PPP frame illustrated in FIG. 11 in frame units. Then, an FCS generating part 32 adds FCS to the PPP frame.

The PPP frame being added with the FCS is supplied to the 7E/7D counting part 33. In addition, each byte in the information field of the PPP frame has its bits inverted by the bit inverting part 34 and is supplied to the 7E/7D counting part 35.

It is to be noted that, for example, the bit inverting part 34 performs the bit inversion in byte units by performing exclusive OR operation with 0xFF on the information field.

The 7E/7D counting part 33 counts the number of bytes of 0x7E or 0x7D in the PPP frame, supplies the counted value to a transmission selection determining part 36c, and supplies the PPP frame to the transmission selecting part 37.

The 7E/7D counting part 35 counts the number of bytes of 0x7E or 0x7D in the inverted PPP frame, supplies the counted value to the transmission selection determining part 36c, and supplies the inverted PPP frame to the transmission selecting part 37.

The transmission selection determining part 36c compares the counted value of the 7E/7D counting part 33 and the counted value of the 7E/7D counting part 35 and instructs (indicates) the transmission selecting part 37 and an SDH framing part 40c to select the PPP frame having a lesser counted value. Accordingly, the transmission selecting part 37 selects the PPP frame supplied from either one of the 7E/7D counting part 33 or the 7E/7D counting part 35 and supplies the selected frame to the byte stuffing part 38.

The byte stuffing part 38 performs byte stuffing on the supplied data in which the byte stuffing part 38 converts 0x7E to 0x7D5E data in a case where 0x7E data exists in the PPP frame and converts 0x7D data to 0x7D5D data in a case where 0x7D exists in the PPP frame. Then, the scrambling part 39 scrambles the PPP frame output from the byte stuffing part 38 and supplies the scrambled PPP frame to an SDH framing part 40c.

The SDH framing part 40c maps the scrambled PPP frame into SDH frame and writes inversion information to N1 byte of a POH (Pass Overhead) of the SDH frame (see FIGS. 13 and 14) according to the instruction (selection instruction) from the transmission selection determining part 36c. The inversion information includes, for example, "0x00" indicating that there is no inverted bits in the information field and "0xFF" indicating that there is an inverted bit(s) in the information field. Further, the SDH framing part allocates (buries) flags in between the SDH frames and transmits the SDH frames to the SDH transmission network 41.

The SDH frames transmitted through the SDH transmission network 41 are received by the receiving apparatus 50. In the receiving apparatus 50, a SDH framing part 51c eliminates the flags provided between the frames and reads out the inversion information of the N1 byte of the POH of the SDH. Then, the inversion information is supplied to a reception selection determining part 57c. Further, the SDH framing part extracts the scrambled PPP frame from the payload of the SDH and supplies the scrambled PPP frame to the descrambling part 52.

Then, the descrambling part 52 descrambles (releases) the scrambled PPP frame and outputs the PPP frame to the byte de-stuffing part 53. Then, the byte de-stuffing part 53 returns the PPP frame back to the state before byte stuffing. Then, the PPP frame is supplied to the bit inverting part 55 and a reception selecting part 58c.

The bit inverting part 55 performs bit inversion on each byte in the information field of the PPP frame in byte units and supplies the PPP frame including the inverted data to the reception selecting part 58c. For example, the bit inverting part 55 performs the bit inversion in byte units by performing exclusive OR operation with 0xFF on the information field.

The reception selection determining part 57c instructs (indicates) the reception selecting part 58c to select either a PPP frame having no bits inverted in the information field (output of the byte de-stuffing part 53) or a PPP frame having an inverted bit(s) in the information field (output of the bit inverting part 55). Accordingly, the reception selecting part 58c selects the PPP frame supplied from either one of the byte de-stuffing part 53 or the bit inverting part 55 and supplies the selected PPP frame to an FCS detecting part 63.

The FCS detecting part 63 detects errors in the PPP frame by using the FCS in the PPP frame and supplies the result of the detection to the PPP decapsulating part 59. The PPP decapsulating part 59 performs PPP decapsulation by extracting the LAN packet data from the information field in the PPP frame and transmits the LAN packet data to an external device.

It is to be noted that bit inversion in the third embodiment is performed on a single PPP frame whereas bit inversion in the fourth embodiment is performed on plural PPP frames multiplexed to an SDH frame.

In this embodiment, although the aspect of writing inversion information to the POH is applied to the configuration of the first embodiment, the aspect of writing inversion information to the POH may also be applied to the configuration of the second embodiment.

With the above-described embodiments of the present invention, increase of bandwidth in the SONET or SDH transmission path according to the patterns of client data can be reduced no greater than half the original bandwidth. Accordingly, transmission bandwidth for preventing loss of data can be reduced. Thus, the margin of bandwidth prepared for client data can be reduced no greater than half the original margin. Thus, bandwidth can be efficiently used while maintaining transmission quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A transmitting apparatus for encapsulating reception data received from an asynchronous network to a frame of a specified format and transmitting the reception data as a synchronous frame to a synchronous network, comprising:
    a code generating part configured to generate an error detection code for detecting an error in the reception data and add the error detection code to the reception data;
    an inverting part configured to perform bit inversion in which the reception data added with the error detection code are converted to bit inverted reception data;
    a selecting part configured to select either the reception data or the bit inverted reception data according to the number of bit patterns included in the reception data and the bit inverted reception data; and
    a transmitting part configured to transmit either the reception data added with the error detection code or the bit inverted reception data selected by the selecting part.

2. The transmitting apparatus as claimed in claim 1, wherein the inverting part is configured to invert each byte of the reception data in bit units.

3. The transmitting apparatus as claimed in claim 1, wherein the inverting part is configured to invert each byte of the reception data in byte units.

4. The transmitting apparatus as claimed in claim 1, further comprising:
    an information writing part configured to write inversion information indicating either the reception data or the bit inverted reception data selected by the selecting part to the frame of the specific format.

5. The transmitting apparatus as claimed in claim 1, further comprising:
    an information writing part configured to write inversion information indicating either the reception data or the bit inverted reception data selected by the selecting part to the synchronous frame.

6. A transmitting apparatus for receiving a synchronous frame from a synchronous network, decapsulating the synchronous frame to a frame of a specified format, the frame of the specified format containing reception data received from an asynchronous network and being added with an error detection code, and transmitting the reception data contained in the frame of the specified format to the asynchronous network, the transmitting apparatus comprising:
    an inverting part configured to perform bit inversion in which the reception data are converted to bit inverted reception data;
    a selecting part configured to select either the reception data or the bit inverted reception data according to the error detection code obtained from the reception data and the error detection code obtained from the bit inverted reception data; and
    a transmitting part configured to transmit either the reception data or the bit inverted reception data selected by the selecting part.

7. The transmitting apparatus as claimed in claim 6, wherein the inverting part is configured to invert each byte of the reception data included in the synchronous frame in byte units.

8. The transmitting apparatus as claimed in claim 6, wherein the inverting part is configured to invert each byte of the reception data included in the synchronous frame in bit units.

9. The transmitting apparatus as claimed in claim 6, further comprising:
    a selection controlling part configured to read out inversion information from the frame of the specified format included in the synchronous frame and control the selection of the reception data or the bit inverted reception data by the selecting part.

10. The transmitting apparatus as claimed in claim 6, further comprising:
    a selection controlling part configured to read out inversion information from the synchronous frame and control the selection of the reception data or the bit inverted reception data by the selecting part.

11. A transmitting method for encapsulating reception data received from an asynchronous network to a frame of a specified format, transmitting the reception data as a synchronous frame from a first transmitting apparatus to a second transmitting apparatus via a synchronous network, and then transmitting the reception data from the second transmitting apparatus to the asynchronous network, comprising the steps of:
    a) generating an error detection code for detecting an error in the reception data;
    b) adding the error detection code to the reception data;
    c) performing bit inversion on the reception data in which the reception data added with the error detection code are converted to bit inverted reception data;
    d) selecting either the reception data or the bit inverted reception data according to the number of bit patterns included in the reception data and the bit inverted reception data;
    e) mapping either the reception data added with the error detection code or the bit inverted reception data selected in step d) into the synchronous frame;
    f) transmitting the synchronous frame from the first transmitting apparatus;
    g) receiving the synchronous frame including the reception data with the second transmitting apparatus;
    h) performing bit inversion in which the reception data included in the synchronous frame are converted to a second bit inverted reception data;
    i) selecting either the reception data included in the synchronous frame or the second bit inverted reception data according to the error detection code obtained from the reception data included in the synchronous frame and the error detection code obtained from the second bit inverted reception data; and
    j) transmitting either the reception data included in the synchronous frame or the second bit inverted reception data selected in step i) to the asynchronous network.

* * * * *